US008327454B2

(12) United States Patent
Jogand-Coulomb et al.

(10) Patent No.: US 8,327,454 B2
(45) Date of Patent: Dec. 4, 2012

(54) METHOD FOR ALLOWING MULTIPLE USERS TO ACCESS PREVIEW CONTENT

(75) Inventors: Fabrice Jogand-Coulomb, San Carlos, CA (US); Oktay S. Rasizade, Castro Valley, CA (US); Haluk K. Tanik, Batman (TR)

(73) Assignee: SanDisk Technologies Inc., Plano, TX (US)

(*) Notice: Subject to any disclaimer, the term of this patent is extended or adjusted under 35 U.S.C. 154(b) by 1357 days.

(21) Appl. No.: 11/599,994

(22) Filed: Nov. 14, 2006

(65) Prior Publication Data

US 2008/0115224 A1 May 15, 2008

(51) Int. Cl.
G06F 21/22 (2006.01)
G06F 17/30 (2006.01)
(52) U.S. Cl. .......................... 726/27; 705/59; 726/2
(58) Field of Classification Search .................. None
See application file for complete search history.

(56) References Cited

U.S. PATENT DOCUMENTS

| 5,509,070 | A | * | 4/1996 | Schull .............................. 705/54 |
| 5,564,038 | A | * | 10/1996 | Grantz et al. .................. 711/164 |
| 5,568,437 | A | | 10/1996 | Jamal |
| 5,732,209 | A | | 3/1998 | Vigil et al. |
| 5,794,006 | A | | 8/1998 | Sanderman |
| 5,805,609 | A | | 9/1998 | Mote, Jr. |
| 5,892,900 | A | | 4/1999 | Ginter et al. |
| 5,982,681 | A | | 11/1999 | Scwarz |
| 5,982,891 | A | | 11/1999 | Ginter et al. |
| 5,995,624 | A | | 11/1999 | Fielder et al. |
| 6,040,622 | A | | 3/2000 | Wallace |
| 6,044,471 | A | * | 3/2000 | Colvin ............................ 726/28 |
| 6,085,320 | A | | 7/2000 | Kaliski, Jr. |
| 6,154,811 | A | | 11/2000 | Srbljic et al. |
| 6,279,114 | B1 | | 8/2001 | Toombs et al. |
| 6,298,446 | B1 | * | 10/2001 | Schreiber et al. ............... 726/27 |
| 6,401,224 | B1 | | 6/2002 | Schoniger et al. |
| 6,732,304 | B1 | | 5/2004 | Ong |
| 6,820,148 | B1 | | 11/2004 | Cedar |
| 6,901,457 | B1 | | 5/2005 | Toombs et al. |
| 6,915,425 | B2 | | 7/2005 | Xu et al. |

(Continued)

FOREIGN PATENT DOCUMENTS

CN 1533646 9/2004

(Continued)

OTHER PUBLICATIONS

International Search Report and Written Opinion for PCT/US2007/023648, dated Nov. 21, 2008, 18 pages.

(Continued)

Primary Examiner — Christopher Revak
(74) Attorney, Agent, or Firm — Brinks Hofer Gilson & Lione

(57) ABSTRACT

A method for allowing multiple users to access preview content is disclosed. In one embodiment, a user is provided with preview content and is allowed to access the preview content even if another user's access to the preview content has expired. In another embodiment, a user is provided with content that he is not allowed to access but is allowed to access a preview version of the content by creating a license that specifies the user's access to the preview content, wherein the license is stored on a memory device that stores the preview content. Other embodiments are disclosed, and each of the embodiments can be used alone or together in combination.

32 Claims, 8 Drawing Sheets

U.S. PATENT DOCUMENTS

| | | | |
|---|---|---|---|
| 6,956,671 | B2 | 10/2005 | Monty et al. |
| 7,010,808 | B1 | 3/2006 | Leung et al. |
| 7,020,704 | B1 | 3/2006 | Lipscomb et al. |
| 7,036,020 | B2 | 4/2006 | Thibadeau |
| 7,107,378 | B1 | 9/2006 | Brewer et al. |
| 7,107,620 | B2 | 9/2006 | Haverinen et al. |
| 7,197,466 | B1* | 3/2007 | Peterson et al. ............... 705/59 |
| 7,209,995 | B2 | 4/2007 | Pinto et al. |
| 7,215,771 | B1 | 5/2007 | Hamlin |
| 7,231,360 | B2* | 6/2007 | Sy .................................. 705/29 |
| 7,284,175 | B2 | 10/2007 | Wang et al. |
| 7,426,747 | B2 | 9/2008 | Thibadeau |
| 7,433,676 | B2* | 10/2008 | Kobayashi et al. ........... 455/408 |
| 7,484,103 | B2* | 1/2009 | Woo et al. ...................... 713/189 |
| 7,493,656 | B2 | 2/2009 | Goodwill et al. |
| 7,549,044 | B2 | 6/2009 | Lee et al. |
| 7,555,464 | B2 | 6/2009 | Candelore |
| 7,685,596 | B1* | 3/2010 | Webb et al. .................... 717/177 |
| 7,698,480 | B2 | 4/2010 | Bychkov et al. |
| 7,702,590 | B2* | 4/2010 | Malik ............................. 705/59 |
| 7,751,801 | B2* | 7/2010 | Torvinen ................... 455/412.1 |
| 7,844,836 | B1* | 11/2010 | Weaver et al. ................. 713/194 |
| 7,890,431 | B2* | 2/2011 | Malik ............................. 705/59 |
| 8,041,337 | B2* | 10/2011 | Kobayashi et al. ........... 455/405 |
| 2002/0003886 | A1 | 1/2002 | Hillegass et al. |
| 2002/0029350 | A1 | 3/2002 | Cooper et al. |
| 2002/0049679 | A1 | 4/2002 | Russell et al. |
| 2002/0052933 | A1 | 5/2002 | Leonhard et al. |
| 2002/0069420 | A1 | 6/2002 | Russell et al. |
| 2002/0077986 | A1* | 6/2002 | Kobata et al. ................... 705/52 |
| 2002/0077988 | A1 | 6/2002 | Sasaki et al. |
| 2002/0095588 | A1 | 7/2002 | Shigematsu et al. |
| 2002/0126846 | A1 | 9/2002 | Multerer et al. |
| 2002/0166047 | A1 | 11/2002 | Kawamoto |
| 2002/0196029 | A1 | 12/2002 | Schmidt |
| 2003/0007646 | A1 | 1/2003 | Hurst et al. |
| 2003/0069853 | A1 | 4/2003 | Bryant |
| 2003/0126086 | A1 | 7/2003 | Sadadi |
| 2004/0019801 | A1 | 1/2004 | Lindholm et al. |
| 2004/0039911 | A1 | 2/2004 | Oka et al. |
| 2004/0049724 | A1 | 3/2004 | Bill et al. |
| 2004/0103234 | A1 | 5/2004 | Zer et al. |
| 2004/0130944 | A1 | 7/2004 | Krause et al. |
| 2004/0179691 | A1 | 9/2004 | Hori et al. |
| 2004/0249768 | A1 | 12/2004 | Konito et al. |
| 2004/0255138 | A1 | 12/2004 | Nakae et al. |
| 2005/0010531 | A1 | 1/2005 | Kushalnagar et al. |
| 2005/0021539 | A1 | 1/2005 | Short et al. |
| 2005/0022015 | A1 | 1/2005 | Van Den Heuvel et al. |
| 2005/0044046 | A1 | 2/2005 | Ishiguro |
| 2005/0198510 | A1 | 9/2005 | Robert et al. |
| 2005/0210236 | A1 | 9/2005 | Lee et al. |
| 2005/0235143 | A1 | 10/2005 | Kelly |
| 2005/0251714 | A1 | 11/2005 | Nishimura |
| 2005/0287987 | A1 | 12/2005 | Yamamoto |
| 2005/0287989 | A1 | 12/2005 | Lee |
| 2006/0059096 | A1 | 3/2006 | Dublish et al. |
| 2006/0063594 | A1 | 3/2006 | Benbrahim |
| 2006/0069644 | A1 | 3/2006 | Vataja et al. |
| 2006/0085353 | A1* | 4/2006 | Wang et al. ...................... 705/59 |
| 2006/0085354 | A1 | 4/2006 | Hirai |
| 2006/0095382 | A1 | 5/2006 | Mahlbacher |
| 2006/0118619 | A1 | 6/2006 | Hulst et al. |
| 2006/0143698 | A1 | 6/2006 | Ohara |
| 2006/0195403 | A1* | 8/2006 | New et al. ........................ 705/59 |
| 2006/0195864 | A1* | 8/2006 | New et al. ........................ 725/25 |
| 2006/0200864 | A1 | 9/2006 | Nakanishi et al. |
| 2006/0236405 | A1 | 10/2006 | Terauchi et al. |
| 2007/0067241 | A1* | 3/2007 | Malik ............................. 705/51 |
| 2007/0067301 | A1* | 3/2007 | Malik ............................. 707/10 |
| 2007/0124603 | A1 | 5/2007 | Yamamichi et al. |
| 2007/0226790 | A1 | 9/2007 | Maher et al. |
| 2007/0255659 | A1 | 11/2007 | Yen et al. |
| 2008/0112566 | A1 | 5/2008 | Jogand-Coulomb et al. |
| 2008/0114982 | A1 | 5/2008 | Bleumer et al. |
| 2008/0244751 | A1 | 10/2008 | Peinado |
| 2008/0256617 | A1 | 10/2008 | Cartwell |
| 2008/0282083 | A1 | 11/2008 | Risan et al. |
| 2009/0138936 | A1 | 5/2009 | Biderman et al. |
| 2009/0158344 | A1 | 6/2009 | Anglin, Jr. |
| 2010/0036748 | A1 | 2/2010 | Siegel et al. |
| 2010/0077202 | A1 | 3/2010 | Lee et al. |
| 2011/0091036 | A1 | 4/2011 | Norman et al. |
| 2011/0099641 | A1* | 4/2011 | Malik ............................. 726/27 |

FOREIGN PATENT DOCUMENTS

| | | |
|---|---|---|
| EP | 0 715 243 | 6/1996 |
| EP | 1 278 331 | 1/2003 |
| EP | 1 280 149 | 1/2003 |
| EP | 1 445 888 | 8/2004 |
| EP | 1 480 103 | 11/2004 |
| EP | 1 496 642 | 1/2005 |
| EP | 1 533 676 A1 | 5/2005 |
| EP | 1 564 961 | 8/2005 |
| EP | 1 598 822 | 11/2005 |
| EP | 1 635 265 | 3/2006 |
| JP | 2004-336719 | 11/2004 |
| JP | 2005085023 | 3/2005 |
| JP | 2006-013641 | 1/2006 |
| WO | WO 02/15020 | 2/2002 |
| WO | WO 02/19266 | 3/2002 |
| WO | WO 03/098409 | 11/2003 |
| WO | WO 2005/084107 A2 | 9/2005 |
| WO | WO 2006/011768 | 2/2006 |
| WO | WO 2006/069311 | 6/2006 |
| WO | WO 2006/109970 | 10/2006 |

OTHER PUBLICATIONS

Final Office Action for U.S. Appl. No. 11/599,655 dated Mar. 5, 2009, 16 pages.

"Microsoft to Embed Viral Growth into Zune MP3," http://www.adrants.com/2006/10/microsoft-to-enbed-viral_-growth-into-zune.php, Oct. 25, 2006, 5 pages.

"Steve Jobs not bothered about Zune," http://www.earthtimes.org/articles/printstory.php?news=9817, Oct. 25, 2006, 1 page.

Mercurio, Chris, "How to Disable the Auto-Launch "feature" for SD Cards", http://mytreao.net/archives.2006/08/hot-to-disable-the-autolaunch-feature-for-sd-cards.html (visited on Dec. 15, 2006).

Knipper, Gary, "System ACE Configuration Solutions for Xilinx FPGA's", White Paper, May 18, 2006, 9 pages.

Verisign, *Unified Authentication Tokens*, http://www.verisign.com/products-services/security-services/unified-authentication/ (visited on Aug. 29, 2006).

*Sample: MIMEfilt Demonstrates MIME Filter for Internet Explorer*, http://www.support.microsoft.com/default.aspx?scid=kb; EN-US;q260840 (visited on Aug. 29, 2006).

Bahman Qawami, Fabrice Jogand-Coulomb, Farshid Sabet, Michael Holtzman, Pascal Caillon, Patricia Dwyer. Paul McAvoy, Pedro Vargas, Po Yuan, Robert C. Chang, "Method for Secure Storage and Delivery of Media Content", filed on Dec. 30, 2005 as U.S. Appl. No. 11/322,812.

Bahman Qawami, Fabrice Jogand-Coulomb, Farshid Sabet, Michael Holtzman, Pascal Caillon, Patricia Dwyer. Paul McAvoy, Pedro Vargas, Po Yuan, Robert C. Chang, "Mobile Memory System for Secure Storage and Delivery of Media Content", filed on Dec. 30, 2005 as U.S. Appl. No. 11/322,726.

Fabrice Jogand-Coulomb, Robert C. Chang, "Method for Interfacing with a Memory Card to Access a Program Instruction", filed on Aug. 25, 2006 as U.S. Appl. No. 11/509,978.

Fabrice Jogand-Coulomb, Robert C. Chang, "System and Computing Device for Interfacing with a Memory Card to Access a Program Instruction", filed on Aug. 25, 2006 as U.S. Appl. No. 11/510,297.

Susan Cannon, Kevin Lewis, "Method for Interacting with a Memory Device in Cryptographic Operations", filed on Aug. 28, 2006 as U.S. Appl. No. 11/511,766.

Susan Cannon, Kevin Lewis, "Memory Device for Cryptographic Operations", filed on Aug. 28, 2006 as U.S. Appl. No. 11/511,687.

Fabrice Jogand-Coulomb, Haluk Kent Tanik, Oktay Rasizade, "Methods for Linking Content With License", filed on Nov. 14, 2006 as U.S. Appl. No. 11/599,655.

Fabrice Jogand-Coulomb, Farshid Sabet Sharghi, Bahman Qawami, "Apparatuses for Binding Content to a Separate Memory Device", filed on Nov. 14, 2006 as U.S. Appl. No. 11/600,245.

Fabrice Jogand-Coulomb, Farshid Sabet Sharghi, Bahman Qawami, "Methods for Binding Content to a Separate Memory Device", filed on Nov. 14, 2006 as U.S. Appl. No. 11/600,262.

Fabrice Jogand-Coulomb, Haluk Kent Tanik, Oktay Rasizade, "Methods for Accessing Content Based on a Session Ticket", filed on Nov. 14, 2006 as U.S. Appl. No. 11/600,263.

Fabrice Jogand-Coulomb, Haluk Kent Tanik, Oktay Rasizade, "Apparatuses for Linking Content with License", filed on Nov. 14, 2006 as U.S. Appl. No. 11/600,270.

Fabrice Jogand-Coulomb, Haluk Kent Tanik, Oktay Rasizade, "Apparatuses for Accessing Content Based on a Session Ticket", filed on Nov. 14, 2006 as U.S. Appl. No. 11/600,273.

Fabrice Jogand-Coulomb, David, Guidry, Pascal Caillon, Benjamin Vigier, "Apparatuses for Launching a Program Application", filed on Dec. 29, 2006 as U.S. Appl. No. 11/647,758.

Fabrice Jogand-Coulomb, David, Guidry, Pascal Caillon, Benjamin Vigier, "Methods for Launching a Program Application", filed on Dec. 29, 2006 as U.S. Appl. No. 11/647,995.

Fabrice Jogand-Coulomb, Oktay S. Rasizade, Haluk K. Tanik, "System for Allowing Multiple Users to Access Preview Content", filed on Nov. 14, 2006 as U.S. Appl. No. 11/599,995.

Fabrice Jogand-Coulomb, Haluk K. Tanik, Oktay S. Rasizade, "Method for Allowing Content Protected by a First DRM System to Be Accessed by a Second DRM System", filed on Nov. 14, 2006 as U.S. Appl. No. 11/600,005.

Fabrice Jogand-Coulomb, Haluk K. Tanik, Oktay S. Rasizade, "System for Allowing Content Protected by a First DRM System to Be Accessed by a Second DRM System", filed on Nov. 14, 2006 as U.S. Appl. No. 11/599,991.

Fabrice Jogand-Coulomb, Pascal A. Caillon, Benjamin Vigier, "Method for Connecting to a Network Location Associated with Content", filed on Nov. 14, 2006 as U.S. Appl. No. 11/600,300.

Fabrice Jogand-Coulomb, Pascal A. Caillon, Benjamin Vigier, "System for Connecting to a Network Location Associated with Content", filed on Nov. 14, 2006 as U.S. Appl. No. 11/600,006.

Invitation to Pay Additional Fees for PCT/US2007/023399, filed on Nov. 9, 2007, 8 pages.

Office Action for U.S. Appl. No. 11/599,655 entitled, "Methods for Linking Content With License", filed on Nov. 14, 2006, 15 pages.

Office Action for U.S. Appl. No. 11/600,270 entitled, "Apparatus for Linking Content with License", filed on Nov. 14, 2006, 13 pages.

International Search Report and Written Opinion for PCT/US2007/023615, dated Jun. 2, 2008, 12 pages.

International Search Report and Written Opinion for PCT/US2007/023617, dated Jun. 11, 2008, 12 pages.

International Search Report and Written Opinion for PCT/US2007/023618, dated May 30, 2008, 10 pages.

International Search Report and Written Opinion for PCT/US2007/023649, dated May 29, 2005, 14 pages.

ISO/IEC 7816 Standard: "Identification Cards Integrated Circuit(s) Cards with Contacts", Part 1: Physical Characteristics, 8 pages.

Kravitz, D.W. et al., "Achieving Media Portability Through Local Content Translation and End-to-End Rights Management", Proceedings of the 5th ACM Workshop on Digital Rights Management, pp. 27-36, Nov. 7, 2005.

Office Action for U.S. Appl. No. 10/888,294, entitled, Non-Volatile Memory System with Self Test Capability, filed on Jul. 9, 2004, 13 pages.

"The Multimedia Card System Specification", Version 2.11, Jun. 1999, Multimedia Card Association, Cupertino, CA, 53 pages.

"The Multimedia Card System Specification", Version 2.2, Jan. 2000, Multimedia Card Association, Cupertino, CA, 123 pages.

The MultimediaCard Product Manual, Revision Apr. 2, 2000, SanDisk Corporation, 86 pages.

Transmittal of the International Search Report and the Written Opinion of the International Search Authority, or the Declaration, Int'l Appl: No. PCT/US2000/024201, Int'l filed Jul. 7, 2005, mailed Dec. 21, 2005, 9 pages.

Wilson, James Y., et al., "Inside Bluetooth-Part 1, "Dr. Dobb's Journal, Mar. 2000, http://www.ddj.com, 5 pages.

Wilson, James Y.; et al., "Inside Bluetooth-Part 2," Dr. Dobb's Journal, Apr. 2000, http://www.ddj.com, 4 pages.

Office Action for U.S. Appl. No. 11/600,005, dated Jun. 30, 2009, 13 pages.

Office Action for U.S. Appl. No. 11/600,300, dated Jul. 14, 2009, 17 pages.

International Search Report and Written Opinion for PCT/US2007/023399, dated Jun. 10, 2008, 17 pages.

Invitation to Pay Additional Fees for PCT/US2007/023648, dated Aug. 5, 2008.

Office Action for U.S. Appl. No. 11/600,006, dated Oct. 24, 2008, 21 pages.

Office Action for U.S. Appl. No. 11/509,978, dated Oct. 27, 2009, 19 pages.

Office Action for U.S. Appl. No. 11/599,655, dated Oct. 28, 2009, 14 pages.

Office Action for U.S. Appl. No. 11/600,005, dated Feb. 23, 2010, 11 pages.

Office Action for U.S. Appl. No. 11/600,245, dated Jan. 19, 2010, 11 pages.

Office Action for U.S. Appl. No. 11/600,262, dated Jan. 27, 2010, 15 pages.

Office Action for U.S. Appl. No. 11/600,300, dated Mar. 8, 2010, 16 pages.

Office Action for U.S. Appl. No. 11/599,995, dated Mar. 22, 2010, 30 pages.

Office Action for U.S. Appl. No. 11/600,263, dated May 24, 2010, 10 pages.

Office Action for U.S. Appl. No. 11/599,655, dated Jun. 21, 2010 14 pages.

Office Action for U.S. Appl. No. 11/600,245, dated Jul. 15, 2010, 12 pages.

Office Action for Chinese Patent Application Serial No. 200780048917.7, dated Sep. 13, 2010, 11 pages.

Office Action for U.S. Appl. No. 11/600,263, dated Dec. 8, 2009, 10 pages.

Office Action for U.S. Appl. No. 11/600,273, dated Dec. 8, 2009, 11 pages.

Office Action for U.S. Appl. No. 11/600,245, dated Jan. 12, 2011, 14 pages.

Office Action for U.S. Appl. No. 11/600,263, dated Dec. 21, 2010, 12 pages.

Office Action for U.S. Appl. No. 11/600,300, dated Mar. 16, 2011, 15 pages.

Office Action for U.S. Appl. No. 11/600,005, dated Apr. 4, 2011, 12 pages.

Office Action for Chinese Patent Application Serial No. 200780046575.5, dated Feb. 17, 2011, 19 pages.

Notice of Allowance for U.S. Appl. No. 11/600,263, dated Aug. 10, 2011, 9 pages.

Office Action for U.S. Appl. No. 11/600,005, dated Dec. 9, 2011, 12 pages.

Office Action for U.S. Appl. No. 11/600,245, dated Nov. 7, 2011, 16 pages.

Office Action for U.S. Appl. No. 11/600,300, dated Nov. 15, 2011, 17 pages.

Office Action for Chinese Patent Application Serial No. 200780045877.0, dated Jul. 13, 2011, 13 pages.

European Search Report for European Patent Application Serial No. 11185500.3, dated Dec. 8, 2011, 6 pages.

Office Action for European Patent Application Serial No. 07 867 399.3, dated Dec. 6, 2011, 8 pages.

Office Action for European Patent Application Serial No. 07 870 860.9, dated Dec. 6, 2011, 6 pages.

Office Action for U.S. Appl. No. 11/600,300, dated Apr. 12, 2012, 16 pages.

Office Action for U.S. Appl. No. 11/600,245, dated Apr. 27, 2012, 15 pages.

Office Action for Chinese Patent Application Serial No. 200780046575.5 dated Mar. 27, 2012, 20 pages.

Office Action for European Patent Application Serial No. 07 870 861.7, dated Jan. 17, 2012, 5 pages.

Office Action for Japanese Patent Application Serial No. 2009-537162, dated Feb. 7, 2012, 6 pages.

* cited by examiner

METHOD FOR ALLOWING MULTIPLE USERS TO ACCESS PREVIEW CONTENT

BACKGROUND

Portable memory devices sometimes store "preview content." Preview content can be a full or partial version of content, such as a song or video, but access to the preview content expires according to an access rule (e.g., after three plays, after one week, after three plays in one week, etc.). The preview content can entice a user to purchase the content in a fuller-access, non-preview form (e.g., a song with unlimited plays), and the user can be provided with a mechanism for making such a purchase, typically after the last time the preview content can be accessed. When access to the preview content expires, the preview content can no longer be accessed by anyone. While this mechanism prevents the user from continuing to access the preview content in violation of the access rules, it also prevents a second user who subsequently obtains the portable memory device from accessing the preview content (e.g., when the original user lends, sells, or otherwise provides the portable memory device to the second user). Accordingly, the second user is not exposed to the preview content, thereby eliminating an opportunity to entice the second user to purchase the content.

SUMMARY

The present invention is defined by the claims, and nothing in this section should be taken as a limitation on those claims.

By way of introduction, the embodiments described below provide a method for allowing multiple users to access preview content. In one embodiment, a user is provided with preview content and is allowed to access the preview content even if another user's access to the preview content has expired. In another embodiment, a user is provided with content that he is not allowed to access but is allowed to access a preview version of the content by creating a license that specifies the user's access to the preview content, wherein the license is stored on a memory device that stores the preview content. Other embodiments are disclosed, and each of the embodiments can be used alone or together in combination.

The embodiments will now be described with reference to the attached drawings.

DETAILED DESCRIPTION OF THE PRESENTLY PREFERRED EMBODIMENTS

Figure 1:
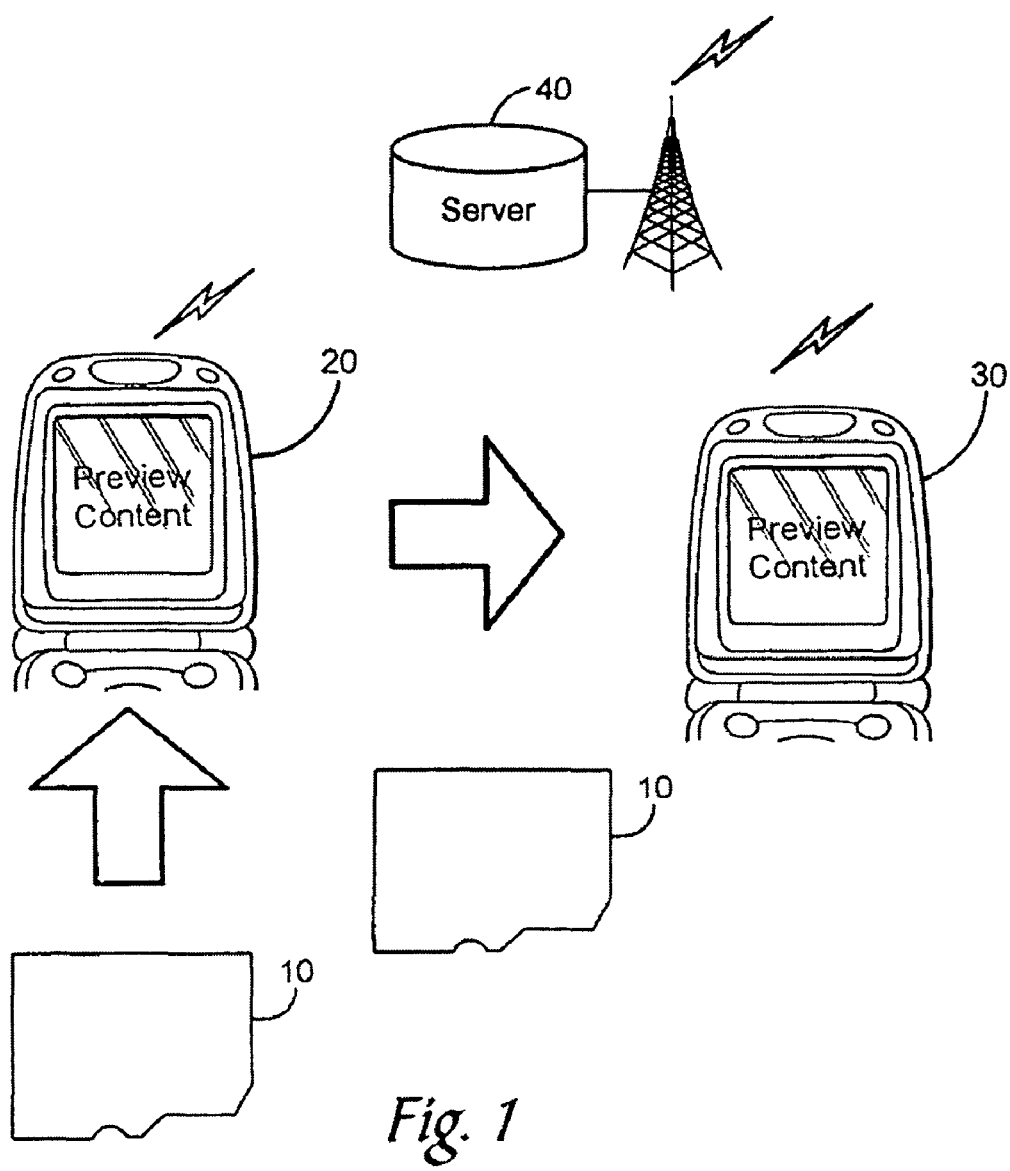
FIG. 1 is an illustration of a system of an embodiment for allowing multiple users to access preview content.

The embodiments described herein allow multiple users to access content set for preview. As used herein, "preview content" refers to content in which access expires according to an access rule. "Content" refers to digital media and can include, but is not limited to, an audio file, a video file (with or without audio), a game, a book, a map, a data file, or a software program. As also used herein, "accessing" is any action taken with respect to the content. Examples of various types of "accessing" include, but are not limited to, playing, displaying, printing, copying, and executing. "Accessing" is something more than just determining the size or location of the content, determining that the content is ciphered, making a failed attempt to access the content, or reading information associated with the content (e.g., in a header) that describes how the content should be handled. Any suitable access rule can be used to determine when access to the preview content expires. The access rule can state, for example, that access to the preview content expires after the preview content has been accessed a certain number of times (e.g., after three plays), after a certain amount of time (e.g., after one week), or both (e.g., after three plays in one week). Of course, other access rules can be used. In one embodiment, which will be described in more detail below, the access rule is provided in a license object associated with the content. Other than the limitation on access provided by the access rule, the preview content can be identical to a fuller-access version of the content. Alternatively, the preview content can be different from the fuller-access version of the content. For example, the preview content can be a shorter version of the content (e.g., only a ten-second clip of a full song), can be a full-length version of the content but limited in quality (e.g., a lower-resolution, but full length, audio or video file), or a shorter version of the content that is also limited in quality (e.g., a ten-second clip of lower-resolution). Greater access can also provide additional features. For example, if the preview content is a game that only allows a user to play certain levels, greater access can allow the user to play additional levels. As another example, greater access to a song can allow a user to generate ring tones or obtain a music video associated with the song.

Content providers can use preview content as a "teaser" to entice a user to purchase the content in a fuller-access, non-preview form (e.g., a song with more or unlimited number of plays, as compared to the preview content). As described in more detail below, after being enticed by the preview content, a user can be provided with a mechanism to purchase a fuller-access version of the content (e.g., via a website accessible by a URL designated by the preview content). Content providers use the access rule to limit access to the preview content to prevent a user from indefinitely accessing the preview content. In one technique to achieve this, when access to the preview content expires, the preview content can no longer be accessed by anyone. While this mechanism prevents the user from continuing to access the preview content in violation of the access rule, it also prevents a different user who subsequently obtains the preview content from accessing the preview content and being tempted into purchasing the fuller-access version of the content. This limits the potential audience for a content provider.

To address this situation, in one embodiment, one or more additional users are allowed to access the preview content even if access to the preview content has expired for a previous user, thereby providing a wider audience for a content provider. This embodiment will be illustrated in conjunction with FIG. 1. In FIG. 1, preview content is preloaded onto a portable memory device 10 (here, a removable memory card). When a first user connects the portable memory device 10 to his host device 20 (here, a cell phone), the first user can access the preview content with his host device 20 until the first user's access to the preview content expires according to the access rule (e.g., after three plays by the first user). By accessing the preview content, the first user may be enticed to purchase the content in a fuller-access, non-preview form. After the first user's access to the preview content expires, the first user can no longer access the preview content.

There are situations in which the first user may give the portable memory device 10 to a second user. For example, the first user may lend the portable memory device 10 to the second user or may give or sell the portable memory device 10 to the second user when the first user upgrades to a larger-capacity portable memory device. Regardless of how the second user obtains the portable memory device 10, when the second user connects the portable memory device 10 to his host device 30 (here, another cell phone), the second user will be able to access the preview content even though access to the preview content has expired for the first user.

As with the first user, after accessing the preview content, the second user may be enticed to purchase the content in a fuller-access, non-preview form. This provides a wider potential audience for the content provider, as compared to a technique in which preview content cannot be accessed by anyone once access to the preview content expires. Also, in situations where the second user already knows he wants to purchase the content before accessing the preview content (and, therefore, does not need the preview content to entice him to make the purchase), the second user can use the purchase mechanism associated with the preview content (e.g., a website accessible by a URL associated with the preview content) as a convenient vehicle for the second user to purchase the content.

As also with the first user, after the second user's access to the preview content expires, the second user can no longer access the preview content. The access rule for the second user can be the same as or different from the access rule for the first user. For example, the access rule can specify three plays for any one user, or it can specify three plays for the first user but only a single play for the second user. Additionally, the type of fuller-access, non-preview version of the content can be the same or different for different users. For example, in one embodiment, all users who purchase a non-preview version of the content can be given the same access (e.g., unlimited plays), while, in another embodiment, one user can be given one type of access (e.g., unlimited plays), while another user can be given another type of access (e.g., 50 plays). Additionally, it should be noted that while only two users are being described here in order to simplify discussion of this embodiment, this embodiment can be used with more than two users.

Many alternatives are possible. For example, in the embodiment shown in FIG. 1, the preview content was preloaded onto the portable memory device 10. In this way, when a user purchases the portable memory device 10, he already has the preview content. In another embodiment, instead of the preview content being preloaded onto the portable memory device 10, the preview content can be "side loaded" from another device (e.g., downloaded onto the portable memory device 10 from a different device, such as the first user's personal computer), or the preview content can be downloaded with the first user's host device 20, for example, from a server 40 in wireless communication with the first user's host device 20. The server 40 can be operated by a mobile network operator or by the content provider, for example.

In another alternative, instead of using the portable memory device 10 to transfer the preview content from the first user's host device 20 to the second user's host device 30, the preview content can be wirelessly transmitted between the devices 20, 30 (e.g., via the mobile operator's network, some other network, or directly between the devices 20, 30) or wirelessly accessed by the second user who gets a preview only (i.e., content is accessed by a second user, and the second user gets a license for preview only). The preview content can be wirelessly transmitted between the devices 20, 30 irrespective of whether the preview content was provided to the first user's host device 20 via the portable memory device 10, via the server 40, or sideloaded from a PC, for example. In yet another embodiment, the preview content is transferred to the second user by transferring both the portable memory device 10 and the host device 20 to the second user. For example, in some countries, users share cells phones, leaving the portable memory device in the phone but swapping subscriber information module (SIM) cards. When the second user inserts his SIM card into the cell phone, the system would recognize him as the second user (from information on the SIM card), and the second user would be able to access the preview content on the portable memory device, even if the first user was no longer allowed to access the preview content. The second user could then use the borrowed cell phone/memory card system to purchase content, which could be downloaded onto the portable memory device in the cell phone and later moved (but not copied, if there is a restriction concerning copying) to the second user's portable memory device. As shown by this example, the identification of a user is not necessarily made based on the host device being used. While the subscriber information in the SIM card was used to identify the user in this example, as will be described below, other identification techniques can be used. Some of the SIM information could also be used to protect access to the content, while some other information could be used to identify a user. For example, the network ID (from IMSI) could be used as a seed to gain access to content and the whole IMSI as a way to identify a user and provide individual preview. Using network binding (i.e., content and preview only available for subscribers of a mobile operator) ensures that payment can easily be handled by the network operator billing system and, thus, would not require complicated steps for the consumer to purchase the content.

It should be noted that while the first and second users' host devices 20, 30 took the form of cell phones in the above embodiment, other types of host devices can be used. As used herein, a "host device" is any device that can be used to access content and includes, but is not limited to, a cell phone, a PC/notebook computer, a handheld computer, a handheld game console, an audio player (e.g., an MP3 player), a video player (e.g., a DVD player or a portable video player), an audio and/or video recorder, a digital camera, a set-top box, a display device (e.g., a television), a printer, a car stereo, and a navigation system. Also, while the first and second users' host devices 20, 30 were the same type of device in the above embodiment (e.g., both cell phones), the first and second users' host devices can be different devices (e.g., one device can be a cell phone and the other device can be an MP3 player). In other words, getting a preview works on any device whether connected or not.

It should also be noted that, while the portable memory device 10 took the form of a removable memory card in the above embodiment, other types of portable memory devices can be used. In general, a portable memory device is any device that contains a storage medium that can store content and be put in communication with a host device that can access the content stored in the storage medium. A portable memory device can contain only memory (and associated circuitry) or can also contain other components, such as a processor. Examples of portable memory devices include, but are not limited to, a removable memory card (e.g., a non-volatile, solid-state memory device, such as a flash memory card), an optical disc, a magnetic disk, as well as any of the examples of host devices listed above, when those devices have a storage medium and the capability of being placed in communication with a host device to access information stored in the storage medium. Accordingly, a "host device" in some situations can be a "portable memory device" to another host device in other situations. For example, while a cell phone was used as the host device in FIG. 1, a cell phone can also be used as a portable memory device when the cell phone is connected to a personal computer so preview content can be delivered from the cell phone to the personal computer. As can be seen from these examples, a portable memory device can serve as a dedicated storage device or can contain additional functionality, such as playing music, making phone calls, etc. Also, while the portable memory device 10 was used in FIG. 1 to both provide the preview content to the first user's host device 20 and then to provide the preview content to the second user's host device 30, it should be understood that, in some situations, a different portable memory device can be used to provide the preview content to the second user's host device 30. For example, in some situations, the preview content on the portable memory device 10 can be moved to a different portable memory device and then provided to the second user's host device 30.

Further, as noted above, a portable memory device is not needed to provide preview content to the first and/or second user. For example, the preview content can be downloaded from the server 40 to the first host device 20 then wirelessly transmitted (or wirelessly accessed) to the second host device 30 that would get a device or user-specific preview access (the device 30 would be identified when wirelessly accessing the content available for preview by providing some information such as device ID, SIM information, or other type of information). Accordingly, a portable memory device is not necessarily needed to practice these embodiments and should not be read into the claims unless explicitly recited therein. (It should be understood that information described herein as "wirelessly transmitted" can also be "wirelessly accessed.")

In yet another embodiment, instead of sharing preview content among users, preview content can be generated for one user based on fuller-access content of another user. Consider, for example, the situation in which a first user purchases a portable memory device with a preloaded album—not a preview version of the album. When the first user gives the portable memory device to a second user, a preview version of the album can be created for the second user to entice the second user to purchase the album—even though the preview version was not made available to the first user (because he purchased the album preloaded on the portable memory device).

With some of the embodiments now generally described, the following is a discussion illustrating a presently preferred implementation. It should be noted that this discussion is one or many implementations of these embodiments and that the implementation details described herein should not be read into the claims unless explicitly recited therein.

Figure 2:
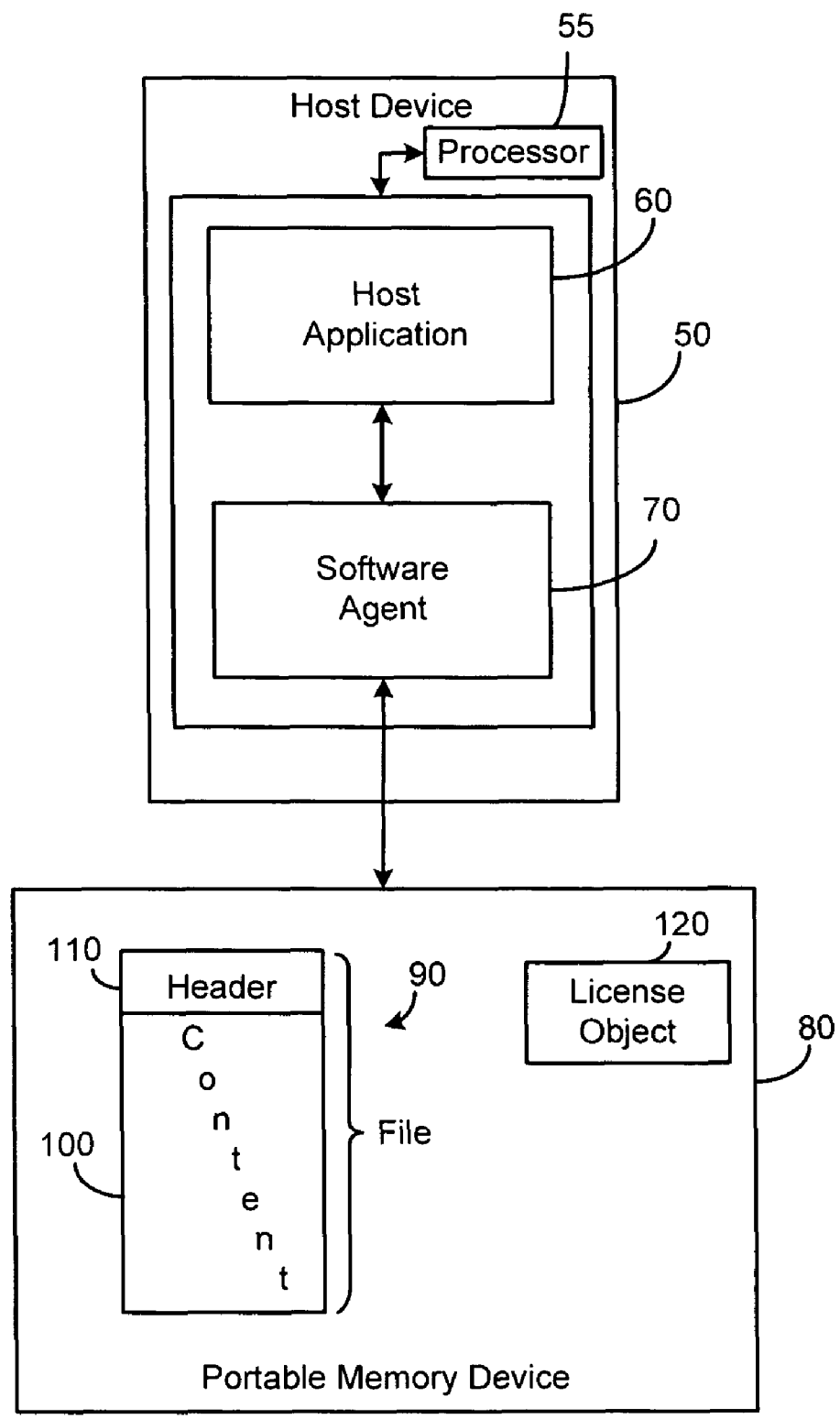
FIG. 2 is an illustration of a host device and a portable memory device of an embodiment.

Returning to the drawings, FIG. 2 is an illustration of a host device 50 of an embodiment. The host device 50 comprises one or more processors 55 executing a host application 60 and a software agent 70. As used herein, a "host application" refers to any application that can be used to access content. Examples of a host application include, but are not limited to, an audio player, a video player, a document viewer, and a browser. It should be noted that the host device 50 can include other host applications in addition to host application 60. In addition to accessing content, a host application can have other functions, such as downloading content and storing information on a portable memory device. The host application 60 may not be able to read certain types of content (such as protected content or content that is otherwise not accessible with the host application 60 alone), and the software agent 70 is an interface that allows the host application 60 to access such types of content. The software agent 70, which may sometimes be referred to herein as a "software development kit (SDK)" or a "toolkit," acts as a library that the host application 60 (or other components in the host device 50) uses to access content or otherwise interact with a portable memory device. For example, the software agent 70 can contain security management functionality, such as login and decrypting mechanisms. Controlling access to content provides the ability to support some types of preview that rely on DRM to enforce content access to expire at some point in time for a given user or device. As described below, the software agent 70 can also play a role in accessing preview content. Both the host application 60 and the software agent 70 can be implemented as computer-readable instructions stored on a computer-readable medium and be executed by one or more processors 55 on the host device 50. Other components of the host device 50, such as a display device and driver(s), are not shown in FIG. 2 for simplicity.

FIG. 2 shows the host device 50 in communication with a portable memory device 80. The portable memory device 80 stores a file 90, which comprises content 100 and a header 110, and a license object 120. (While the portable memory device 80 is being used in this embodiment to provide the content 100 to the host device 50, as noted above, the content 100 can be downloaded or otherwise provided to the host device 50 without the use of the portable memory device 80.) The header 110 contains information about the file 90 and can identify, for example, whether the content 110 is preview content, whether the content 100 is encrypted, whether the content 100 is protected by a digital rights management (DRM) system, where to find the license object 120, and where to log-in to perform DRM authentication. Instead of being stored in the header 100, the information about the file 90 can be stored in a footer, in some other location in the file 90 (e.g., in some portion of the preview content 100), or in a location external to the file 90 (e.g., in a separate file). The license object 120 (or "license" or "content license") is an entity that stores permissions or restrictions regarding the access of the content 100, if the content 100 is protected by DRM. (It should be noted that "object" is being used herein as a generic description of an entity (e.g., a file, a part of a file, etc.) and can be, but is not necessarily, an "object" in the object-oriented programming sense.) For example, the license object 120 can restrict the number of times the content 100 can be accessed or set an expiration date and time for such access. The license object 120 can also contain a reference pointer or name of a key to use to un-cipher the content, as well as login information to authenticate a user to access the content. As described below, the license object 120 may not be present if the content is not protected by DRM.

Figure 3:
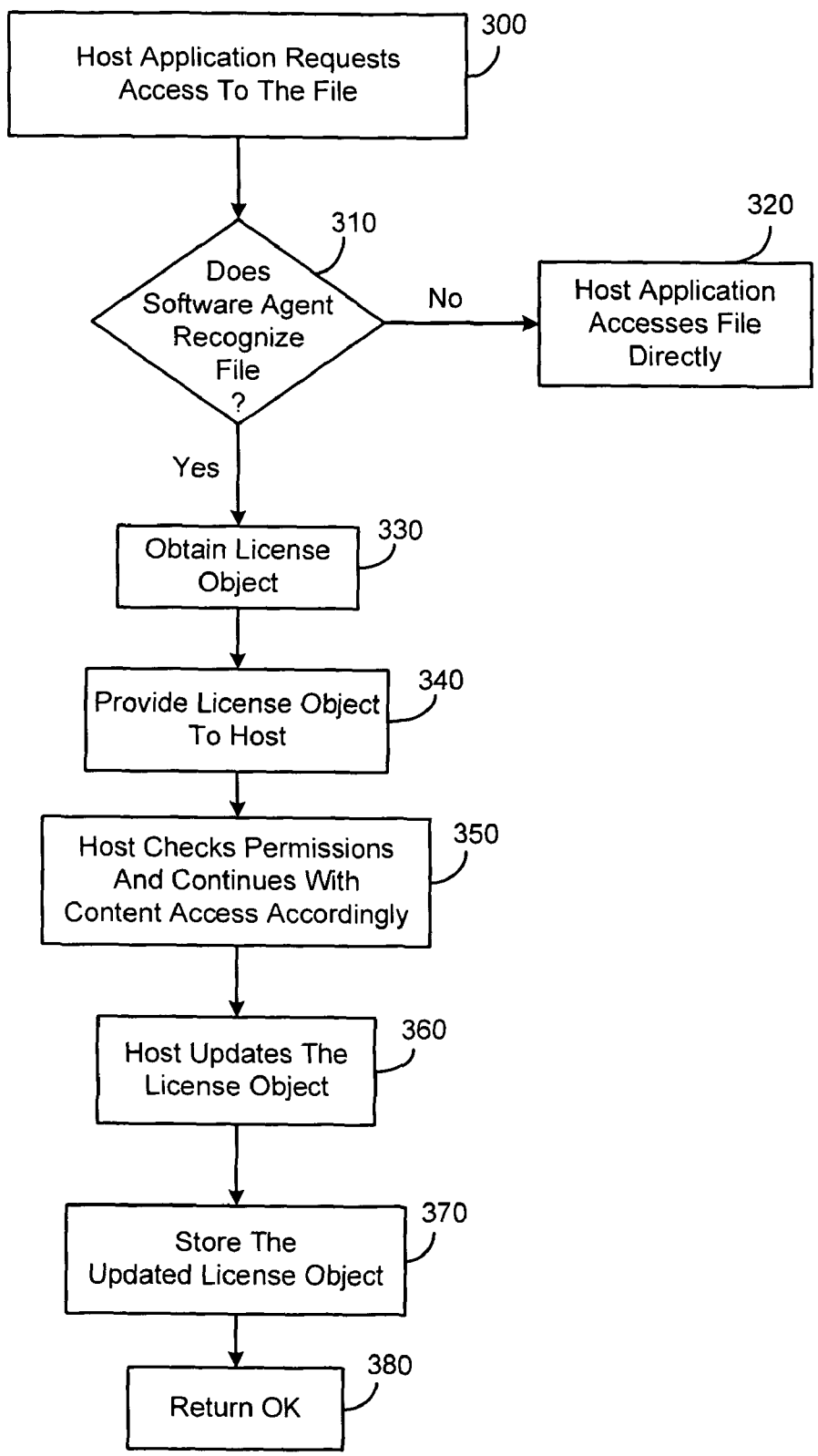
FIG. 3 is a flow chart of a method of an embodiment for allowing multiple users to access preview content.

In this embodiment, the content 100 is preview content, and FIG. 3 is a flow chart of a method of an embodiment for allowing multiple users to access the preview content. First, the host application 60 requests access to the file 90 (act 300), and the software agent 70 receives the request. (It should be noted that a request "received from a user" can be directly received from the user or received from a component on the user's behalf, as in this situation where the request sent by the host application 60 to the software agent 70 is on behalf of the user. A request can be sent on behalf of a user when a user specifically makes a request to a component (e.g., the host application 60) or when a component makes the request automatically on behalf of the user.) The software agent 70 then determines if it recognizes the file 90 as one it should handle (act 310). In this embodiment, this determination is made by determining whether the file 90 has a header 110 recognized by the software agent 70. (In embodiments where a header 110 is not used, the software agent 70 can make the determination, for example, by checking the content 110 to see if it is in an expected file format.) If the software agent 70 does not recognize the file 90 as one it should handle, the host application 60 accesses the file directly (act 320).

Figure 4:
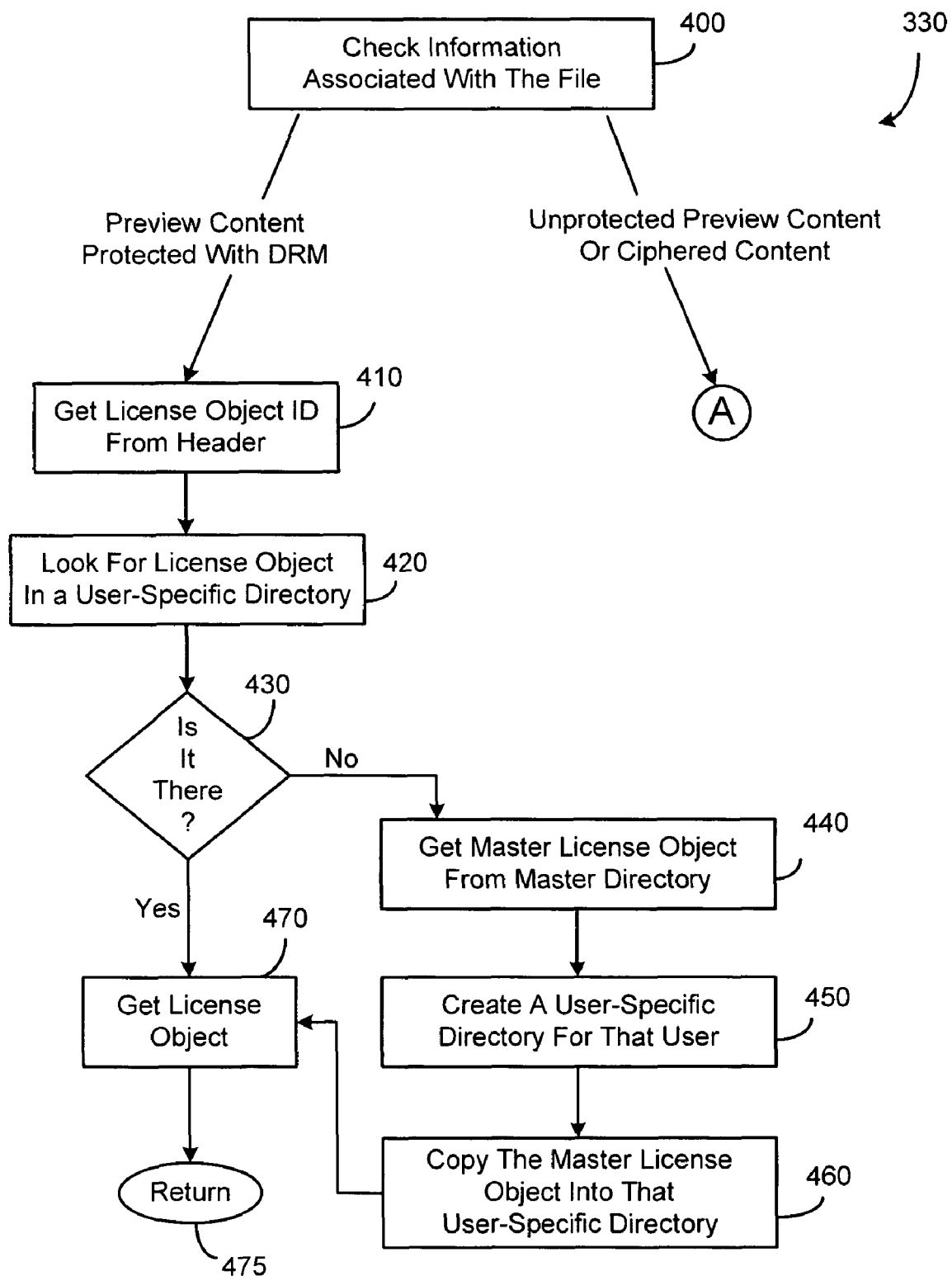
FIG. 4 is a flow chart of a method of an embodiment for obtaining a license object.

If the software agent 70 recognizes the file 90 as one it should handle, the software agent 70 attempts to obtain the license object (act 330). This act will be described in more detail in conjunction with the flow chart in FIG. 4. Referring to FIG. 4, in this act, the software agent 70 first checks the information associated with the file 90 (in this embodiment, in the header 110) to determine if the content 100 is preview content protected with DRM or whether the content 100 is either unprotected preview content or ciphered content. If the content 100 is preview content protected with DRM, there will be a license object stored in the portable memory device (or in another location, as described below). If the content is not protected by DRM (either if the content 100 is unprotected preview content or ciphered content without DRM), a license object will be generated on the fly. A license is generated when content is set or authorized for preview. Information indicating that content is set or authorized for preview can be stored in the header of the file, for example, or some other location.

Figure 5:
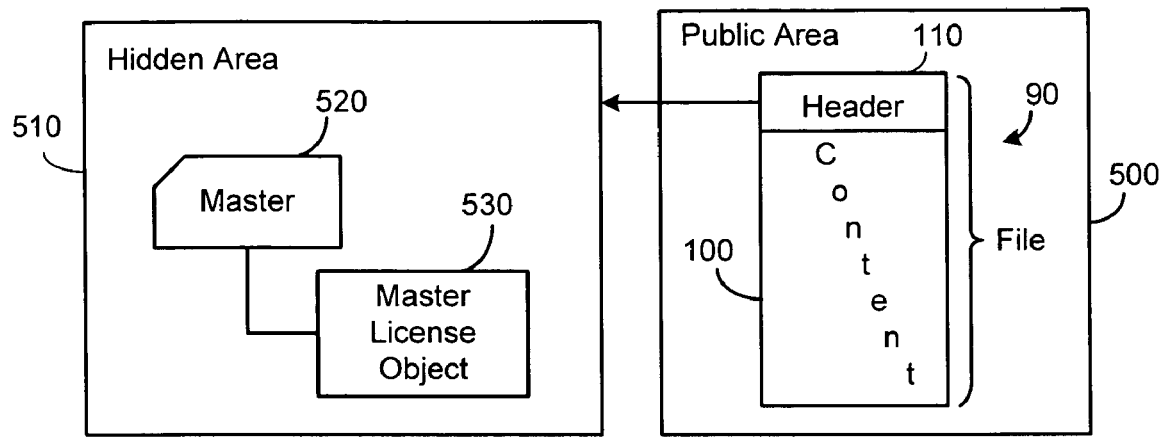
FIGS. 5-7 are illustrations of directory structures of an embodiment.

Dealing first with the situation in which the content 100 is preview content protected with DRM, the software agent 70 gets the license object ID (e.g., a reference pointer, wherein the license object is in a file named after the reference pointer) from the header 110 (act 410). As shown in FIG. 5, the file 90 is stored in a public area 500 of the portable memory device 80 (i.e., an area that is accessible by a user), while the license object is stored in a hidden area 510 of the portable memory device 80 (i.e., in an area not normally accessible by a user).

Next, the software agent 70 looks for the license object, which is identified by the license object ID in the header 110 of the file 90, in a user-specific area such as a directory in the hidden area 510 (act 420) or a specific portion of a license associated with content or a license for that content referenced after the user, etc. In this embodiment, a user-specific directory is a directory named in some way to associate that directory with a particular user. For ease of illustration, the terms "user1," "user2," "user3," etc. will be used herein as the naming convention. It should be understood that any other type of naming convention can be used. For example, the name of the directory can be based on an International Mobile Subscriber Identifier) number from a SIM (Subscriber Identification Module (IMSI) card. So, "user1" can be a network ID and a subscriber ID, or it can be a phone number and a network ID. Other naming conventions are possible, including those identifying a user by login name, social security number, email address, or any other type of identifier. To make this method transparent to the user, it may be preferred to use an identifier that does not require input from the user (e.g., using an IMSI number instead of requesting the user to enter his email address).

For purposes of illustration, assume that the person attempting to access the preview content 100 is a first user identified by the name "user1." The software agent 70 looks for the user1 directory in the hidden area 510 (act 420) and determines if it is there (act 430). As shown in FIG. 5, a directory for user1 does not exist in the hidden area 510 the first time the first user attempts to access the preview content 100. The hidden area 510 does contain, however, a master directory 520 storing a master license object 530. The master license object 530 contains the permissions for accessing the preview content 100. For example, the master license object 530 can specify that the preview content 100 can only be accessed five times. Since the master license object 530 is in the hidden area 510, an ordinary user cannot access the master license object 530 to change the permissions to allow unlimited access to the preview content 100.

Figure 6:
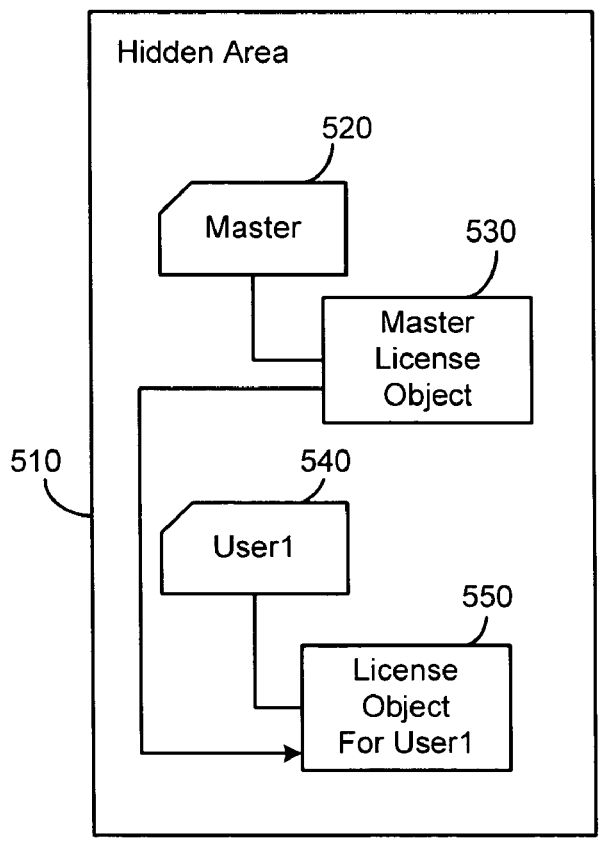

Since the hidden area 510 does not contain a user-specific directory, the software agent 70 gets the master license object 530 from the master directory 520 (act 440). Then, with reference to FIG. 6, the software agent 70 creates a user-specific directory for the first user (the user1 directory 540) (act 450) and copies the master license object 520 into the user1 directory 540, thereby creating a clone of the license object 550 for the first user (act 460). Like the master license object 530, the cloned license object 550 for the first user will specify that the preview content 100 can only be accessed five times. The software agent 70 then gets the cloned license object 550 for the first user (act 470), and the method returns (act 475) to act 340 in the flow chart in FIG. 3.

At act 340, the software agent 70 provides the license object (in this example, the cloned license object 550 for the first user) to the host 50. While the license object provided to the host can be identical to the license object obtained in act 330, a new license object can be generated that is customized for the host 50 and contains additional permissions for security reasons (e.g., restrictions on moving or copying the content). The host 50 (e.g., the host application 60 or some other component on the host, such as a host DRM component) checks the permissions in the license object 550 and continues to access the content 100 in accordance with these permissions (act 350). (It should be noted that the phrase "provide a user with access according to what is specified in a license" includes the situation where a user is not provided with access if the license does not grant access permission to the user.) In this example, the license object 550 indicated that the first user could access the preview content 100 five times, so the host application 60 is allowed to access the preview content 100. (As used herein, the phrase "providing the user with access to the preview content according to what is specified in the license" includes the possibility of not providing the user with access to the preview content if the user does not have access to the preview content.) The host 50 then updates the first user's license object 550 (act 360). In this example, since the license object 550 originally specified that the preview content 100 can be accessed five times, the host 50 would update the first user's license object 550 by decrementing this permission to four times. In act 370, the updated license object 550 is stored. It should be noted that it is the first user's license object 550—not the master license object 530—that gets updated and stored. As explained below, this allows multiple users to access the preview content 100 even after access to the preview content 100 expires for the first user. After the license object is stored, the software agent 70 returns an "ok" to the host application 60 to return control to that entity (act 380).

Returning to the flow chart in FIG. 4, the next time the first user attempts to access the preview content 100, the software agent 70 will find and return the license object 550 in the user-specific directory (i.e., in the previously-created user1 directory) during acts 420, 430, 470, and 475. The host 50 will check the permissions in the license object 550, see that the user is allowed to access the preview content 100 four more times, and then decrement that number to three times after the preview content 100 is accessed. This process repeats each time the first user accesses the preview content 100 until the first user no longer has permission to access the preview content 100.

Figure 7:
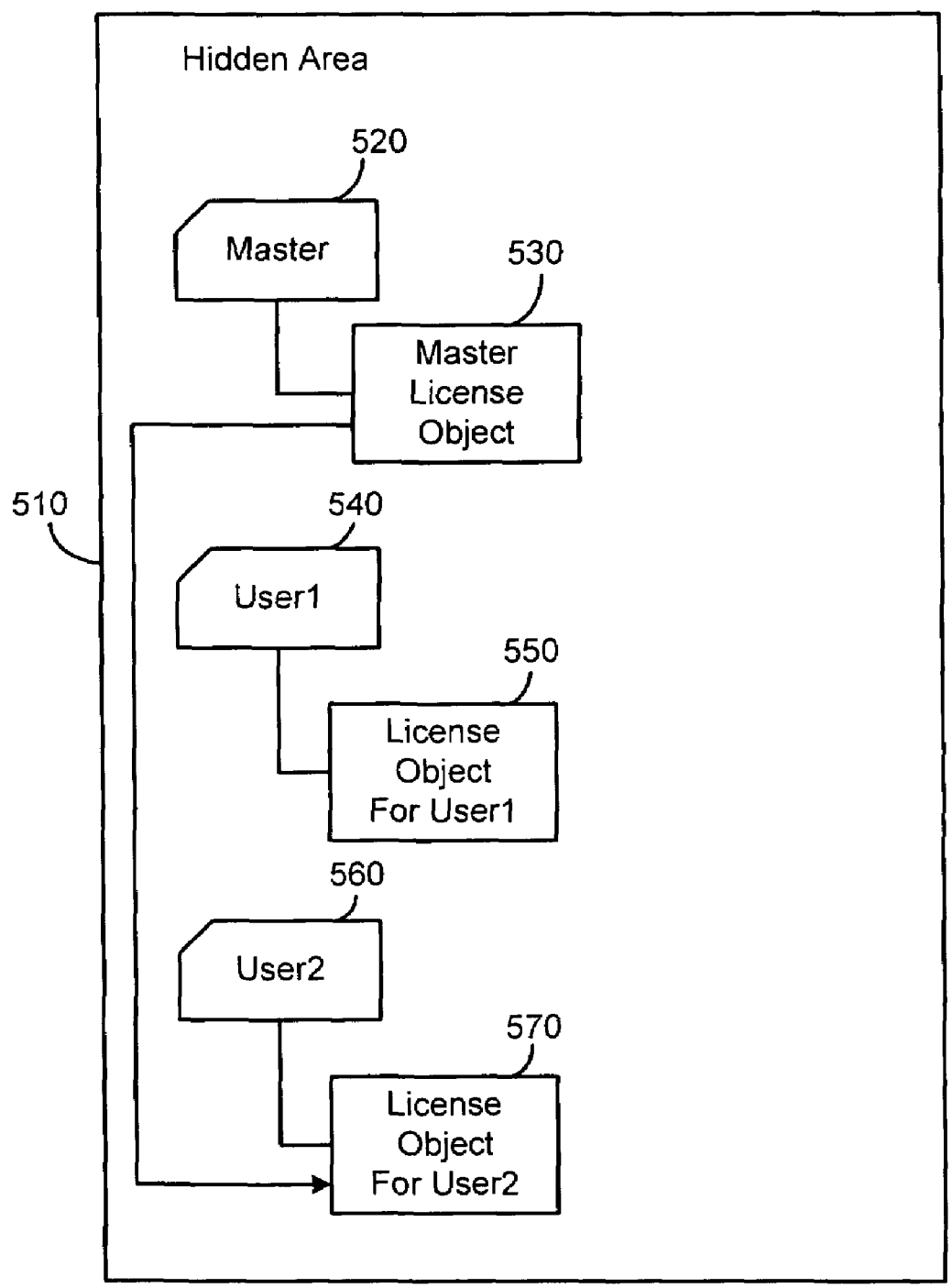

As mentioned above, there are situations in which the first user may give the portable memory device 80 to a second user. In such situations, it is desired for the second user to be able to access the preview content 100 even if the first user no longer has permission to do so. The method in this embodiment allows for this situation. When the second user requests access to the preview content 100, the acts from FIGS. 3 and 4 are performed as described above. However, when the software agent 70 looks for a license object in a user-specific directory for the second user (acts 420 and 430), it will not find one because one does not exist yet (see FIG. 6). This situation is similar to the one faced by the first user the first time he attempted to access the preview content 100. Accordingly, acts 440-470 are performed for the second user, with a new directory (i.e., the user2 directory 560) being created in the hidden area 510, and the master license object 530 being copied into the user2 directory for the second user, thereby creating a cloned version of the master license object 530 for the second user as license object 570 (see FIG. 7). Note that because the license object 570 for the second user is a copy of the master license object 530 and not a copy of the license object 550 for the first user, the second user is permitted to access the preview content 100 five times (as specified in the master license object 530), even if the first user has fewer (or no) access permissions to the preview content 100. The same situation occurs for other users who later obtain the portable memory device 80, thereby providing a mechanism for multiple users to access the preview content 100 even if one or more previous users no longer can access the preview content 100 (assuming the other users have permission to access the preview content).

The example provided above dealt with the situation in which the preview content 100 was protected with DRM. In other situations, the preview content 100 can be designated as preview content in the header 110 but the preview content 100 is not protected by DRM. In other words, a license object will not be associated with the preview content 100, and the portable memory device 80 will not contain a master license object specifying a limitation on the access of the preview content 100. However, some restriction on access of the preview content 100 is desired; otherwise, the content would have unlimited access and would not be preview content. The acts in FIG. 8 address this situation. When the software agent 70 encounters unprotected preview content, it will first look for a license object in a user-specific directory for that user (act 580) and determine if a license object is there (act 582). There will not be a user-specific directory with a license object for a user the first time the user attempts to access the content, and the software agent 70 will generate a license object on the fly for the user (act 588). This license object can allow access the unprotected preview content only a single time or some other limited number of times. The software agent 70 also creates a user-specific directory (act 590), stores the generated license object in the user-specific directory (act 590), and the returns the generated license object to the host 50 (act 586). If a license object already exists in a user-specific directory, the software agent 70 will get that license object (act 584) and return it to the host 50 (act 586). With the license object returned to the host, the method continues with acts 350-380, as described above.

As noted in the flow chart in FIG. 3, the act of generating a license object on the fly can also be used to provide preview content of ciphered, full-access content. (It should be noted that ciphering is merely one method to control access. Accordingly, this embodiment can be used with content that is protected or that otherwise has restricted access—not necessarily ciphered content.) In this situation, a first user has access to a non-preview (e.g., full) version of content, but the content is ciphered (e.g., copy-protected) and cannot be accessed by a second user who does not know/have permission to un-cipher the content. For example, if the ciphered content is only allowed to be accessed by users of a particular mobile network, only those users belonging to that mobile network (as indicated in an identifier in a SIM card, for example) can access the content or get an individual preview when the content is set for preview. Accordingly, a second user who is not part of that mobile network will not be able to access the content, even if the content is copied onto his portable memory device. Even though the second user is not able to access the full version of the content, the content provider may desire to allow the second user to access a preview version of the content, so that the second user may be enticed to purchase the content. In that case, the preview content might be protected in such a way that the second user can access it and then be redirected to an adequate service (knowing the user is not a subscriber of that network) to purchase and download the full track content.

Figure 8:
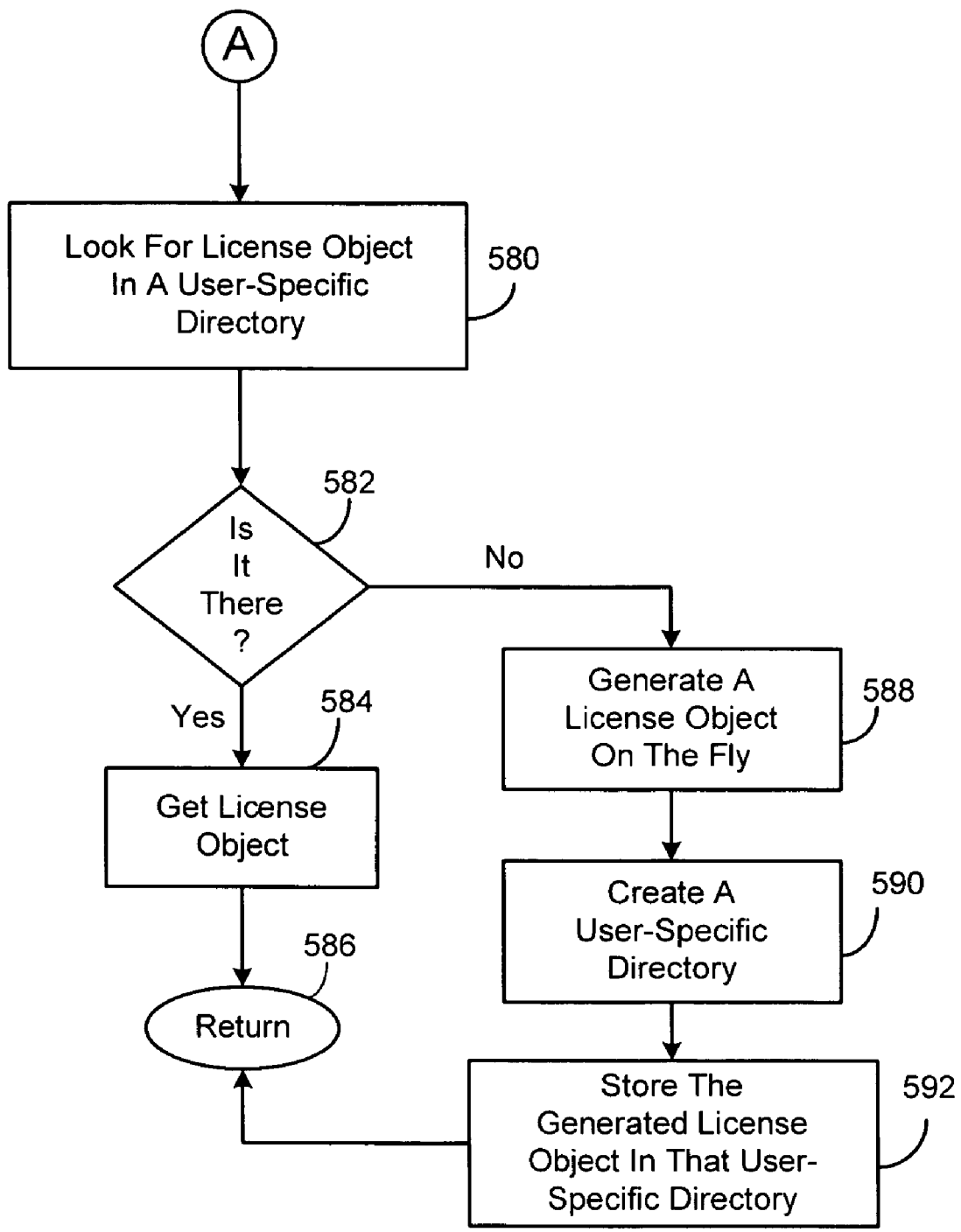
FIG. 8 is a flow chart of a method of an embodiment for generating a license object on the fly.

In such a situation, the method shown in FIG. 8 and described above with respect to unprotected preview content can be used. As in the situation with unprotected preview content, because the ciphered content is not preview content protected by DRM, there is no master license object associated with it. Accordingly, the software agent 70 creates a license object on the fly (act 588), with the license object having some limited access to allow a second user to access the content in preview form. As also described above, after the preview content has been accessed, the license object is updated to prevent the second user from accessing the content more than the allowed number of times.

There are several alternatives that can be used with these embodiments. For example, while the preview content was described as being supplied by a portable memory device, as mentioned above, the preview content can be downloaded from a server, sideloaded, and/or wirelessly transmitted between host devices. Also, while the license object was described as being stored on the portable memory device, it should be understood that the license object can be stored in any suitable location, such as the host device or a device accessible via a network. Accordingly, the content and the license do not need to be stored on the same device.

Additionally, in the example described above, the master license object and license objects for various users were stored in separate directories (or objects). If one wanted to delete the preview file 90 from the portable memory device 80, one would also desire to delete all of the license objects associated with that file 90 to provide additional free space in the hidden area 510 (or in the area (e.g. database) where this information is kept). However, during such a delete operation, the system would know of the existence of the master directory 520 and the directory of the current user and could delete those directories (or objects), but it would not know of the existence of the other user directories (and objects) and, therefore, would not be able to delete those. Because the system would not delete all of the license objects associated with the preview file 90, the hidden area 510 would be cluttered with unneeded information (directories or objects).

Figure 9:
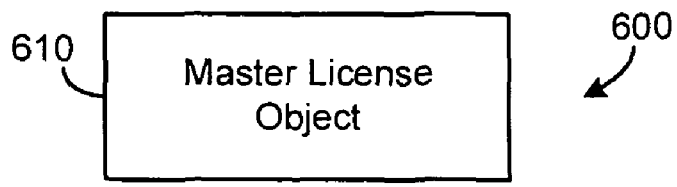
FIGS. 9-11 are illustrations of an alternate embodiment in which license objects are stored in a single file instead of in different directories.
Figure 10:
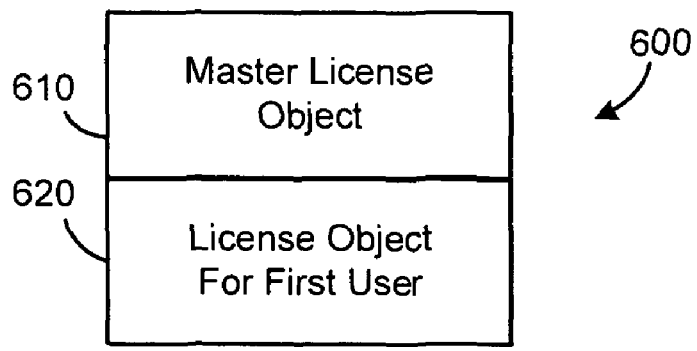
Figure 11:
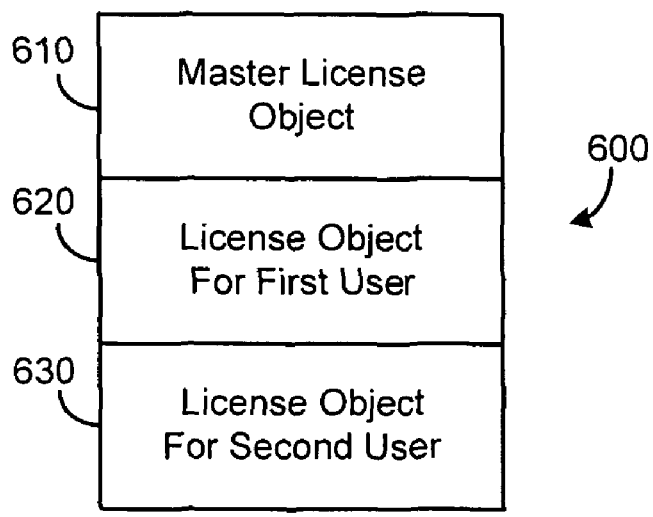

To overcome this issue, in an alternate embodiment, instead of storing license objects in different directories, all of the license objects can be stored in a single file 600, as illustrated in FIGS. 9-11. As shown in FIG. 9, a file 600 contains the master license object 610. Continuing to FIG. 10, when a license object 620 for a first user is created, instead of storing that license object 620 in a separate directory, as was done in the example above, the license object 620 is appended to the file 600 containing the master license object 610. This continues as additional license objects are created for additional users (as shown in FIG. 11 with the license object 630 for the second user). (The various license objects in the file 600 can be encrypted with different keys. In this way, if someone hacks or otherwise obtains one of the keys, he can change the permissions in only one of the license objects.) The advantage of this alternative is that when the content file is deleted, all of the license objects for the content file can be deleted by deleting one file 600 (or a single object).

Figure 12:
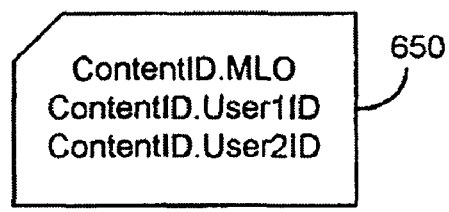
FIG. 12 is an illustration of an alternate embodiment is which license objects are stored as separate files with different file extensions.

In another alternative, instead of using separate directories or a single file, a single directory can be used to store all of the license objects (e.g., as separate files) for a given piece of content. (The single directory can alternatively store all of the license objects for all content.) The files for the various license objects can have different extensions to distinguish them from each other. For example, in the directory 650 shown in FIG. 12, each license object has the same file name (here, a name that associates it with a specific piece of content) but a different extension. In this example, the extension MLO indicates that a file is the master license object, while the extensions user1ID and user2ID indicate that the files are the license objects for the first and second users, respectively. Because all of the license objects for a given piece of content have the same name (but different file extensions), when the content is deleted, all of the license objects can be easily found (by searching for the content name) and deleted.

In another alternative, when a user no longer has access to the preview content (or at some other time, such as after a user accesses the content), the user can be given the opportunity to purchase or otherwise obtain a non-preview version of the content. This may be especially preferred in situations where a license object is generated on the fly. In one embodiment, a URL (or some other type of network location identifier) is associated with the preview content 100, and the host device 50 connects to a website identified by the URL to enable the user to purchase or otherwise obtain a non-preview version of the content. The URL can be contained, for example, in the header 110 of the file 90, the footer of the file 90, in the content 100, or in some other location (e.g., in another file), and license object can be generated in such a way as to inform the host 50 to connect to the URL at the appropriate time. In some situations, when the user purchases a non-preview version of the content, only a new license object is downloaded. However, in other situations, both a new license object and a copy of the content are downloaded. This can occur, for example, if, for security reasons, the DRM system of the host does not allow the license object to be delivered separately from the content. This can also occur if the preview content is a shorter or lower-resolution version of the content that is being purchased. Alternatively, a portable memory device can store both a shorter or lower-resolution version of the content as well as a full version of the content. The user would be prevented from accessing the full version of the content until he purchases it, in which case a new license object would be downloaded that grants access to the full version of the content. This is described in more detail in "Method for Secure Storage and Delivery of Media Content," U.S. patent application Ser. No. 11/322,812, and "Mobile Memory System for Secure Storage and Delivery of Media Content," U.S. patent application Ser. No. 11/322,726, both of which were filed on Dec. 30, 2005, are assigned to the assignee of the present application, and are hereby incorporated by reference. Further, additional information about the use of a network location in this and related contexts can be found at "Method for Connecting to a Network Location Associated with Content," U.S. patent application Ser. No. 11/600,300; and "System for Connecting to a Network Location Associated with Content," U.S. patent application Ser. No. 11/600,006, both of which are being filed on the same date as the present application, are assigned to the assignee of the present invention, and are hereby incorporated by reference.

It should also be noted that some of the acts described herein can be performed in a different order. For example, while the act of generating a license was described as being performed before the act of creating a user-specific directory, the user-specific directory can be created first. Accordingly, the acts described in the specification and recited in the claims should not be read as requiring a specific order unless explicitly mentioned. Further, while certain acts were described herein as being performed by the software agent, host application, or host, it should be noted that these acts can be performed by different entities named or unnamed herein. For example, an environment can be designed such that some or all of the acts performed in the example by the software agent are instead performed by the host application. Additionally, the host and/or portable memory devices can have other components that perform some or all of the acts. For example, the host or the portable memory device can have a DRM module that checks permissions and updates the license object. Accordingly, performance of the acts described herein can be distributed in any suitable fashion. Further, while these embodiments can be implemented in any suitable environment, it is presently preferred that these embodiments be implemented on a TrustedFlash™ platform by SanDisk Corporation.

In one embodiment, a computer-readable storage media stores computer-readable operational instructions (i.e., computer-readable program code) to perform the acts involved in these embodiments. Examples of computer-readable storage media include, but are not limited to, a solid-state storage device, an optical storage device (e.g., a CD or DVD), and a magnetic storage device (e.g., a hard drive). The phrase "computer-readable media" is intended to cover either a single storage medium or a plurality of storage media in one or more devices. Accordingly, "computer-readable media" can be located, for example, in the host device, in the portable memory device, or distributed between a host device and a portable memory device. In one embodiment, the portable memory device can contain computer-readable media that carries the operational instructions (i.e., computer-executable code) to implement the software agent. These instructions can be provided to the host device when the portable memory device is put into communication with the host device. These instructions are then stored in computer-readable media in the host device. In this way, the software agent can be placed on a host device in a plug-and-play fashion. In another embodiment, the software agent is pre-loaded onto the host device, so the computer-readable media in the host device carries the operational instructions to implement the software agent when the host device is sold to the end user.

In any situation, the operational instructions can be executed by one or more processors in the host device, portable memory device, or some other device (e.g., a computer in the network). Further, as mentioned above, the performance of the acts can be distributed. For example, a processor in the portable memory device can execute some of the operational instructions (stored in the computer-readable media in the portable memory device or the host), while the processor in the host device can execute other ones of the operational instructions (stored in the computer-readable media in the portable memory device or the host). Additionally, instead of being stored in computer-readable media and executed by a processor(s), some or all of the operational instructions can be implemented in hardware. For simplicity, the term "circuitry" will be used herein to cover a purely hardware implementation, a purely software implementation, and/or an implementation that uses both hardware and software. Accordingly, "circuitry" can take the form of a processor and computer-readable program code that is stored in a computer-readable medium and is executable by the processor. "Circuitry" can also take the form of an application specific integrated circuit (ASIC), a programmable logic controller, an embedded microcontroller, and a single-board computer. Accordingly, the term "circuitry" should not be limited to any particular type of implementation, described herein or otherwise. Further, "circuitry" should not be limited to performing the functions described herein. For example, when circuitry takes the form of a processor executing software, it should be understood that the processor can perform functions in addition to the ones described above.

The following patent documents contain embodiments that can be used with the embodiments described herein. Each of these patent documents is being filed on the same date as the present application, is assigned to the assignee of the present invention, and is hereby incorporated by reference: "Methods for Linking Content with License," U.S. patent application Ser. No. 11/599,655; "Apparatuses for Linking Content with License," U.S. patent application Ser. No. 11/600,270; "Methods for Accessing Content Based on a Session Ticket," U.S. patent application Ser. No. 11/600,263; "Apparatuses for Accessing Content Based on a Session Ticket," U.S. patent application Ser. No. 11/600,273; "Methods for Binding Content to a Separate Memory Device," U.S. patent application Ser. No. 11/600,262; "Apparatuses for Binding Content to a Separate Memory Device," U.S. patent application Ser. No. 11/600,245; "System for Allowing Multiple Users to Access Preview Content," U.S. patent application Ser. No. 11/599,995; "Method for Allowing Content Protected by a First DRM System to Be Accessed by a Second DRM System," U.S. patent application Ser. No. 11/600,005; "System for Allowing Content Protected by a First DRM System to Be Accessed by a Second DRM System," U.S. patent application Ser. No. 11/599,991; "Method for Connecting to a Network Location Associated with Content," U.S. patent application Ser. No. 11/600,300; and "System for Connecting to a Network. Location Associated with Content," U.S. patent application Ser. No. 11/600,006.

It is intended that the foregoing detailed description be understood as an illustration of selected forms that the invention can take and not as a definition of the invention. It is only the following claims, including all equivalents, that are intended to define the scope of this invention. Finally, it should be noted that any aspect of any of the preferred embodiments described herein can be used alone or in combination with one another.

What is claimed is:

1. A method for allowing first and second users to access preview content stored on a portable memory device that is directly physically coupled to a host device, the method comprising:
performing the following in the portable memory device that is directly physically coupled to the host device:
receiving a request from the second user via the host device to access the preview content stored on the portable memory device, wherein the first user's access to the preview content expires according to an access rule; and
allowing the second user to access the preview content even if the first user's access to the preview content has expired.

2. The method of claim 1, wherein the preview content is protected with a digital rights management (DRM) system.

3. The method of claim 1, wherein the preview content is not protected with a digital rights management (DRM) system.

4. The method of claim 1, wherein the portable memory device comprises a removable memory card.

5. The method of claim 1, wherein the portable memory device comprises a device selected from: a portable audio player, a portable video player, and a cell phone.

6. The method of claim 1 further comprising providing the second user with an opportunity to obtain a non-preview version of the preview content.

7. The method of claim 1 further comprises updating a license to reflect that the second user was allowed to access the preview content.

8. The method of claim 1 further comprising creating a license that specifies the second user's access to the preview content.

9. The method of claim 8, wherein the license is stored on the portable memory device that stores the preview content.

10. The method of claim 8, wherein the license is created by copying a master license.

11. The method of claim 10, wherein both the master license and the license are stored on the portable memory device that stores the preview content.

12. A method for allowing a user to access a preview version of content that the user is not allowed to access, the method comprising:
performing the following in a portable memory device that is directly physically coupled to a host device:
determining that there is content stored on the portable memory device that a user is not allowed to access, wherein a second user is allowed to access the content; and
allowing the user to access a preview version of the content that is stored on the portable memory device via the host device by creating a license that specifies the user's access to the preview content, wherein the license is stored on the portable memory device.

13. The method of claim 12, wherein the portable memory device comprises a removable memory card.

14. The method of claim 12, wherein the portable memory device comprises a device selected from: a portable audio player, a portable video player, and a cell phone.

15. The method of claim 12 further comprising providing the user with an opportunity to obtain access to the content.

16. The method of claim 12 further comprises updating a license to reflect that the user was allowed to access the preview content.

17. A method for allowing access to preview content, the method comprising:

performing the following in a portable memory device that is directly physically coupled to a host device:

(a) determining if there is a license that specifies a user's access to preview content stored on the portable memory device;

(b) when if there is a license that specifies the user's access to the preview content:

providing the user with access to the preview content via the host device according to what is specified in the license even if another user's access to the preview content has expired; and (c) when there is not a license that specifies the user's access to the preview content:

(c1) creating a license that specifies the user's access to the preview content; and (c2) providing the user with access to the preview content via the host device according to what is specified in the license created in (c1) even if another user's access to the preview content has expired.

18. The method of claim 17, wherein the license is created in (c1) by copying a master license.

19. The method of claim 18, wherein the master license is stored in a master license directory, and wherein the method further comprises storing the license created in (c1) in a user-specific directory.

20. The method of claim 18, wherein the master license is stored in a file, and wherein the method further comprises appending the license created in (c1) to the file storing the master license.

21. The method of claim 18, wherein the master license is stored in a directory, and wherein the method further comprises storing the license created in (c1) in the same directory as the master license.

22. The method of claim 17, wherein (b) further comprises updating the license to reflect that the user was permitted to access the preview content.

23. The method of claim 17, wherein (c) further comprises updating the license created in (c1) to reflect that the user was permitted to access the preview content.

24. The method of claim 17, wherein there is a license that specifies the user's access to the preview content because the preview content is protected with a digital rights management (DRM) system.

25. The method of claim 17, wherein there is not a license that specifies the user's access to the preview content because the preview content is not protected with a digital rights management (DRM) system.

26. The method of claim 17, wherein there is not a license that specifies the user's access to the preview content because the preview content is based on ciphered content.

27. The method of claim 17 further comprising repeating (a)-(c) for a different user.

28. The method of claim 17, wherein the portable memory device was used to provide the preview content to the another user.

29. The method of claim 28, wherein the portable memory device comprises a removable memory card.

30. The method of claim 28, wherein the portable memory device comprises a device selected from: a portable audio player, a portable video player, and a cell phone.

31. The method of claim 17 further comprising providing the user with an opportunity to obtain a non-preview version of the preview content.

32. The method of claim 31, wherein providing the user with the opportunity to obtain the non-preview version of the preview content comprises connecting the user to a web site that allows the user to obtain the non-preview version.

\* \* \* \* \*